US009347838B2

(12) United States Patent
Chen et al.

(10) Patent No.: US 9,347,838 B2
(45) Date of Patent: May 24, 2016

(54) CAPACITIVE SHEAR FORCE SENSOR AND METHOD FOR FABRICATING THEREOF

(71) Applicant: Industrial Technology Research Institute, Hsinchu (TW)

(72) Inventors: Sheng-Jui Chen, Taoyuan County (TW); Gwo-Jen Wu, Hsinchu (TW); Chung-Lin Wu, Hsinchu (TW); Jian-Lin Huang, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 454 days.

(21) Appl. No.: 13/896,333

(22) Filed: May 17, 2013

(65) Prior Publication Data

US 2014/0174204 A1    Jun. 26, 2014

(30) Foreign Application Priority Data

Dec. 20, 2012    (TW) .............................. 101148793 A (51) Int. Cl.
| | | |
|---|---|---|
| *G01L 1/14* | (2006.01) | |
| *G01L 5/22* | (2006.01) | |
| *B25J 13/08* | (2006.01) | |

(52) U.S. Cl.
CPC ............... *G01L 1/142* (2013.01); *B25J 13/083* (2013.01); *G01L 5/226* (2013.01)

(58) Field of Classification Search
CPC .......... G01L 1/12; G01L 9/0072; G01L 1/142
USPC .................................................... 73/862.626
See application file for complete search history.

(56) References Cited

U.S. PATENT DOCUMENTS

| | | |
|---|---|---|
| 5,225,959 A | 7/1993 | Stearns |
| 5,313,840 A | 5/1994 | Chen et al. |

(Continued)

FOREIGN PATENT DOCUMENTS

| | | | |
|---|---|---|---|
| JP | 0278925 | * | 3/1990 |
| TW | 200715423 | | 4/2007 |

(Continued)

OTHER PUBLICATIONS

Office Action of Taiwan Counterpart Application, issued on Jun. 23, 2014, p. 1-p. 9, in which the listed references were cited.

(Continued)

*Primary Examiner* — Lisa Caputo
*Assistant Examiner* — Octavia Hollington
(74) *Attorney, Agent, or Firm* — Jianq Chyun IP Office (57) ABSTRACT

A capacitive shear force sensor and a method for fabricating thereof are provided. The capacitive shear force sensor includes a first electric field shielding layer, a second electric field shielding layer, a driving electrode, a first sensing electrode, a second sensing electrode and a dielectric layer. The second electric field shielding layer is disposed under the first electric field shielding layer. The driving electrode is disposed between the first electric field shielding layer and the second electric field shielding layer. The first and the second sensing electrodes are disposed between the driving electrode and the second electric field shielding layer. The dielectric layer is disposed between the driving electrode and the first sensing electrode, and between the driving electrode and the second sensing electrode. The first sensing electrode and the driving electrode form a first capacitor. The second sensing electrode and the driving electrode form a second capacitor.

53 Claims, 8 Drawing Sheets

(56) References Cited

U.S. PATENT DOCUMENTS

| | | | |
|---|---|---|---|
| 6,341,532 | B1 | 1/2002 | Xu et al. |
| 7,343,813 | B1 | 3/2008 | Harrington |
| 8,189,300 | B1 * | 5/2012 | Bonin .......................... 360/290 |
| 8,250,926 | B2 | 8/2012 | Yang et al. |
| 9,112,058 | B2 * | 8/2015 | Bao et al. |
| 2011/0266923 | A1 | 11/2011 | Chuang et al. |
| 2011/0314924 | A1 | 12/2011 | Chandrasekharan et al. |
| 2012/0219701 | A1 | 8/2012 | Wu |
| 2012/0299863 | A1 | 11/2012 | Yilmaz |

FOREIGN PATENT DOCUMENTS

| | | |
|---|---|---|
| TW | 200909135 | 3/2009 |
| TW | 200915932 | 4/2009 |
| TW | 200921483 | 5/2009 |
| TW | 201017139 | 5/2010 |
| TW | 201102632 | 1/2011 |
| TW | 201135203 | 10/2011 |

OTHER PUBLICATIONS

K. Noda et al., "A shear stress sensor for tactile sensing with the piezoresistive cantilever standing in elastic material," Sensors and Actuators A: Physical, vol. 127, Issue 2, Mar. 13, 2006, pp. 295-301.

Mohsin I. Tiwana et al., "Characterization of a capacitive tactile shear sensor for application in robotic and upper limb prostheses," Sensors and Actuators A: Physical, vol. 165, Issue 2, Feb. 2011, pp. 164-172.

M. Y. Cheng et al., "Tactile and Shear Stress Sensing Array Using Capacitive Mechanisms With Floating Electrodes," 23rd IEEE International Conference on Micro Electro Mechanical Systems (MEMS), Jan. 24-28, 2010, pp. 228-231.

H. K. Lee et al., "Normal and Shear Force Measurement Using a Flexible Polymer Tactile Sensor With Embedded Multiple Capacitors," Journal of Microelectromechanical Systems, vol. 17, No. 4, Aug. 2008, pp. 934-942.

K. Kim et al., "3-Axes Flexible Tactile Sensor Fabricated by Si Micromachining and Packaging Technology," 19th IEEE International Conference on Micro Electro Mechanical Systems (MEMS), Jan. 22-26, 2006, pp. 678-681.

J. G. Rocha et al., "3 Axis Capacitive Tactile Sensor and Readout Electronics," IEEE ISIE, Jul. 9-12, 2006, pp. 2767-2772.

Chen et al., "A force measurement system based on an electrostatic sensing and actuating technique for calibrating force in a micronewton range with a resolution of nanonewton scale," Measurement Science and Technology, Mar. 15, 2011, pp. 1-9.

\* cited by examiner

CAPACITIVE SHEAR FORCE SENSOR AND METHOD FOR FABRICATING THEREOF

CROSS-REFERENCE TO RELATED APPLICATION

This application claims the priority benefit of Taiwan application serial no. 101148793, filed on Dec. 20, 2012. The entirety of the above-mentioned patent application is hereby incorporated by reference herein and made a part of this specification.

TECHNICAL FIELD

The disclosure relates to a sensor, and particularly relates to a capacitive shear force sensor.

BACKGROUND

Recently, studies about robots have been prosperous. Developing the sensing functions of artificial intelligence, such as the tactile, thermal, visual, and auditory sensors allows the robots to effectively and safely interact with human beings or the external environment. Specifically, the tactile sensors are an indispensable interface for the robots to contact the external environment. The tactile sensors can be primarily categorized into piezoresistive, capacitive, piezoelectric, and optical types of tactile sensors. In general applications, piezoresistive and capacitive tactile sensors are two common types of tactile sensors.

Most of the tactile sensors used in the robots sense normal forces (contact pressure). However, when a robotic claw grabs an object, the strength of the shear force (e.g. frictional force) may need to be sensed as well as the strength of the grabbing force, so as to predict the occurrence of a sliding movement, and feedback and adjust the grabbing force to prevent the object from falling. Therefore, the tactile sensors not only need to sense a normal force, namely the grabbing force, but also to sense a shear force perpendicular to the grabbing force in order to dynamically obtain the information about the frictional force and the sliding movements experienced by the object. In addition, in the application of assembly of parts in the production line, such as connectors, plugs and sockets, the tactile sensors adapted for sensing the shear force may prevent the parts from being damaged due to inappropriate collision during assembling.

SUMMARY

The disclosure provides a capacitive shear force sensor and a method for fabricating thereof.

Embodiments in the disclosure provide a capacitive shear force sensor, including a first electric field shielding layer, a second electric field shielding layer, a driving electrode, a first sensing electrode, a second sensing electrode, and a dielectric layer. The second electric field shielding layer is disposed under the first electric field shielding layer. The driving electrode is disposed under the lower surface of the first electric field shielding layer and disposed between the first electric field shielding layer and the second electric field shielding layer. The first sensing electrode and the second sensing electrode are disposed on an upper surface of the second electric field shielding layer and disposed between the driving electrode and the second electric field shielding layer. The second sensing electrode does not contact the first sensing electrode. The first sensing electrode and the driving electrode form a first capacitor, and the second sensing electrode and the driving electrode form a second capacitor. The dielectric layer is disposed between the driving electrode and the first sensing electrode and between the driving electrode and the second sensing electrode.

Embodiments of the disclosure provides a method for fabricating a capacitive shear force sensor, including: disposing a first electric field shielding layer; disposing a driving electrode on a lower surface of the first electric field shielding layer; disposing a second electric field shielding layer; disposing a first sensing electrode and a second sensing electrode on an upper surface of the second electric field shielding layer, wherein the second sensing electrode does not contact the first sensing electrode; stacking the first electric field shielding layer on the second electric field shielding layer, such that the driving electrode, the first sensing electrode, and the second sensing electrode are disposed between the first electric field shielding layer and the second electric field shielding layer; and disposing a dielectric layer between the driving electrode and the first sensing electrode and between the driving electrode and the second sensing electrode, wherein the first sensing electrode and the driving electrode form a first capacitor, and the second sensing electrode and the driving electrode form a second capacitor.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Throughout the specification (including the claims) of the disclosure, the term "couple" may refer to any direct or indirect connection. For example, if the text describes that a first device is coupled to a second device, an intended meaning is that the first device may be directly connected to the second device, or the first device may be indirectly connected to the second device via another device or a connection means. Moreover, where applicable, elements/components/steps with same reference numerals represent same or similar parts in the drawings and embodiments. Elements/components/steps with same reference numerals or described with same terms in different embodiments may serve as cross-reference and related description.

Figure 1:
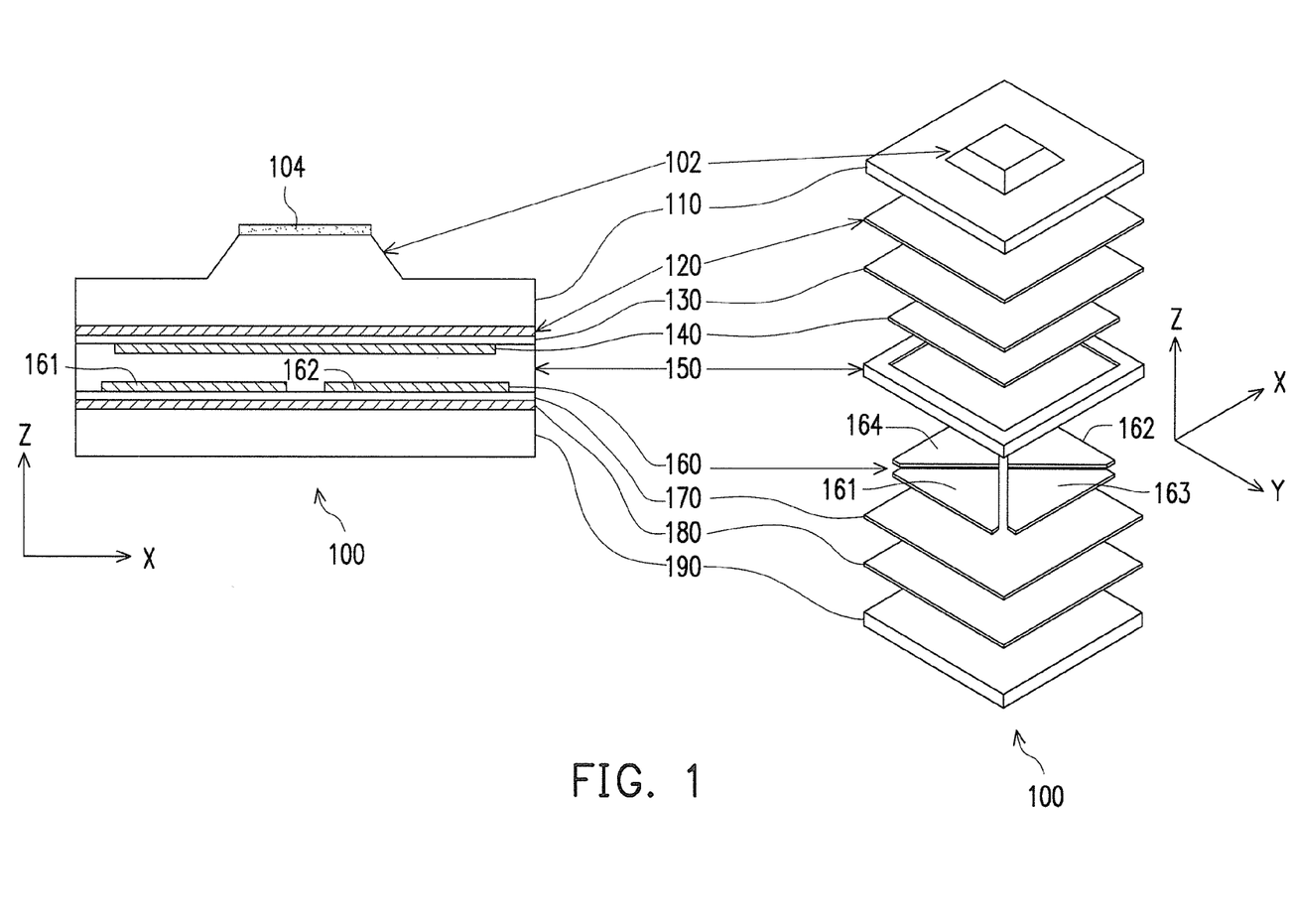
FIG. 1 is a structural schematic view illustrating a capacitive shear force sensor according to an embodiment of the disclosure.

FIG. 1 is a structural schematic view illustrating a capacitive shear force sensor 100 according to an embodiment of the disclosure. The right part of FIG. 1 illustrates an exploded view of the capacitive shear force sensor 100, whereas the left part of FIG. 1 illustrates a cross-sectional view of the capacitive shear force sensor 100. The capacitive shear force sensor 100 includes a first electric field shielding layer 120, a driving electrode 140, a dielectric layer 150, a plurality of sensing electrodes 160, and a second electric field shielding layer 180. In this embodiment, the sensing electrodes 160 include a first sensing electrode 161, a second sensing electrode 162, a third sensing electrode 163, and a fourth sensing electrode 164.

Material of the first electric field shielding layer 120 and the second electric field shielding layer 180 is a conductive material, such as metals (gold, silver, copper, aluminum, or other metals or alloys), chemical compounds, or other conductive materials. The first electric field shielding layer 120 and the second electric field shielding layer 180 are conductive substrates. A material of the driving electrode 140 and the sensing electrodes 160 is a conductive material, such as metals (gold, silver, copper, aluminum, or alloys, etc.), non-metals (e.g. graphite) chemical compounds, or other conductive materials.

The first electric field shielding layer 120 has a lower surface. The driving electrode 140 is disposed under the lower surface of the first electric field shielding layer 120. The second electric field shielding layer 180 has an upper surface. The first sensing electrode 161, the second sensing electrode 162, the third sensing electrode 163, and the fourth sensing electrode 164 are disposed on the upper surface of the second electric field shielding layer 180. The first electric field shielding layer 120 is stacked on the second electric field shielding layer 180, such that the driving electrode 140 is disposed between the first electric field shielding layer 120 and the second electric field shielding layer 180, and the sensing electrodes 160 are disposed between the driving electrode 140 and the second electric field shielding layer 180, wherein the first sensing electrode 161, the second sensing electrode 162, the third sensing electrode 163, and the fourth sensing electrode 164 do not contact each other. The first sensing electrode 161, the second sensing electrode 162, the third sensing electrode 163, and the fourth sensing electrode 164 are respectively in a triangular shape, and the first sensing electrode 161, the second sensing electrode 162, the third sensing electrode 163, and the fourth sensing electrode 164 together form a rectangular shape, as shown in FIG. 1.

In this embodiment, the capacitive shear force sensor 100 further includes an upper board 110, a first insulating layer 130, a second insulating layer 170, and a lower board 190. A material of the upper board 110 and the lower board 190 is a hard material, such as a printed circuit board (PCB), a bakelite, a metal, an ebonite rubber, or other hard materials. The upper board 110 and the lower board 190 prevent the electrodes or shielding layers from being bent and deformed. The upper board 110 is disposed on an upper surface of the first electric field shielding layer 120 to receive a shear force. In this embodiment, the first electric field shielding layer 120 and the driving electrode 140 are fixed to the upper board 110. The lower board 190 is disposed under a lower surface of the second electric field shielding layer 180. In this embodiment, the sensing electrodes 160 and the second electric field shielding layer 180 are fixed to the lower board 190.

In this embodiment, the upper surface of the upper board 110 has at least one bump 102 to receive a shear force. To increase frictional force, a frictional layer 104 is disposed on an upper surface of the bump 102. A material of the frictional layer 104 may be any material having a high friction coefficient, or any material having a slight viscosity. It should be noted that in some applications, the frictional layer 104 may be omitted.

The first insulating layer 130 is disposed between the first electric field shielding layer 120 and the driving electrode 140. The second insulating layer 170 is disposed between the second electric field shielding layer 180 and the sensing electrodes 160 (i.e. 161 to 164). A material of the first insulating layer 130 and the second insulating layer 170 is a non-conductive material to prevent a short circuit between the electrodes and the shielding layers. The first insulating layer 130 and the second insulating layer 170 may also be used as an adhesive layer between the electrodes and the shielding layers. The material of the first insulating layer 130 and the second insulating layer 170 is a hard material, such as a printed circuit board, parylene, or other hard materials.

The dielectric layer 150 is disposed between the driving electrode 140 and the sensing electrodes 160. In this embodiment, the dielectric layer 150 is an elastic spring unit. The dielectric layer 150 may experience a force that is applied externally to the capacitive shear force sensor 100, and generate an elastic deformation. When choosing a material, the elasticity and the creep characteristic may be considered. For example, the material of the dielectric layer 150 is a soft material, such as a soft high-molecular material (polydimethylsiloxane (PDMS)), silicon rubber, etc. In addition, in some embodiments, the dielectric layer 150 may be implemented with a material having a high dielectric constant to improve a capacitance signal. The material of the dielectric layer 150 is a non-conductive material. The dielectric layer 150 may be used as an insulator between the driving electrode 140 and the sensing electrodes 160 to prevent a short circuit between the driving electrode 140 and the sensing electrodes 160.

The structure between the upper board 110 and the lower board 190 is not limited to the above-described manner. In other embodiments, for example, a spacer may be disposed between the upper board 110 and the lower board 190. The spacer is an elastic spring unit, so as to resist the normal force and prevent a short circuit between the driving electrode 140 and the sensing electrodes 160. Due to the shear force, elastic deformation of the spacer in shear direction can occur. A material of the spacer may be chosen to be a material having elasticity and a creep characteristic. Under the conditions of the spacer disposed between the upper board 110 and the lower board 190, the material of the dielectric layer 150 may be gas (e.g. air, etc.), liquid or vacuum.

In Z-axis direction, the driving electrode 140 is partially overlapped with the first sensing electrode 161, the driving electrode 140 is partially overlapped with the second sensing electrode 162, the driving electrode 140 is partially overlapped with the third sensing electrode 163, and the driving electrode 140 is partially overlapped with the fourth sensing electrode 164. In other embodiments, the driving electrode 140 may be completely overlapped with the first sensing electrode 161, the second sensing electrode 162, the third sensing electrode 163, and/or the fourth sensing electrode 164, wherein the first sensing electrode 161 and the driving electrode 140 form a first capacitor, the second sensing electrode 162 and the driving electrode 140 form a second capacitor, the third sensing electrode 163 and the driving electrode 140 form a third capacitor, and the fourth sensing electrode 164 and the driving electrode 140 form a fourth capacitor. By adding a shielding structure external to a capacitor electrode plate, an external interference is reduced. The first electric field shielding layer 120 and the second electric field shielding layer 180 may protect a differential capacitance signal from external interference. A shear force in X-axis direction makes the upper board 110 and the driving electrode 140 move along X-axis. A shear force in Y-axis direction makes the upper board 110 and the driving electrode 140 move along Y-axis. Therefore, the first sensing electrode 161 and the second sensing electrode 162 may sense the shear force in X-axis direction, whereas the third sensing electrode 163 and the fourth sensing electrode 164 may sense the shear force in Y-axis direction.

Figure 2:
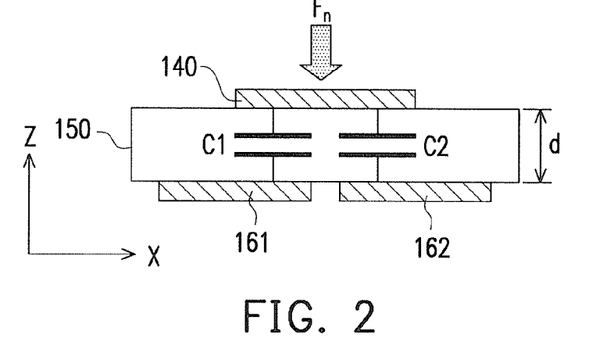
FIG. 2 is a schematic view illustrating a capacitive shear force sensor applied with a normal force and without any shear forces according to an embodiment of the disclosure.

For example, FIG. 2 is a schematic view illustrating a capacitive shear force sensor applied with a normal force Fn and without any shear forces according to an embodiment of the disclosure. FIGS. 1 and 2 serve as cross-reference to each other. Here, the sensing electrodes 160 (i.e. 161 to 164) are fixed electrodes, and the driving electrode 140 is a moving electrode. A capacitance gap between the moving and fixed electrodes is filled by the dielectric layer 150 as an insulating layer. The dielectric layer 150 is a stressed elastic body for measuring a shear force. In addition, the dielectric layer 150 protects the moving electrode (i.e. the driving electrode 140) and the fixed electrodes (i.e. the sensing electrodes 160) from contacting each other and causing a short circuit.

In the following description, the first sensing electrode 161 and the second sensing electrode 162 are utilized as an example to describe the embodiment illustrated in FIGS. 2 to 4. The third sensing electrode 163 and the fourth sensing electrode 164 may be embodied with reference to the description of the first sensing electrode 161 and the second sensing electrode 162. Referring to FIG. 2, the first sensing electrode 161 and the driving electrode 140 form a first capacitor C1, and the second sensing electrode 162 and the driving electrode 140 form a second capacitor C2. When a capacitive shear force sensor experiences a normal force Fn in Z-axis direction, the normal force Fn may make the upper board 110 and the driving electrode 140 move in a direction opposite to Z-axis direction, such that an electrode spacing between the capacitor C1 and the capacitor C2 equivalently decreases.

$$C = \frac{\varepsilon\varepsilon_0 A}{d} \quad \text{Equation (1)}$$

Equation (1) is a parallel-plate capacitor equation, wherein $\varepsilon$ is a dielectric constant of the dielectric layer 150, $\varepsilon_0$ is a vacuum dielectric constant, d is an electrode spacing, and A is an overlapped area size of electrode plates. The normal force Fn does not change the overlapped area size A of electrode plates of the capacitor C1 and the capacitor C2, but makes the electrode spacing d between the capacitor C1 and the capacitor C2 equivalently decrease. The normal force Fn makes capacitance values of the capacitor C1 and the capacitor C2 equivalently increase. Namely, the normal force Fn does not change a capacitance difference ΔC between the capacitor C1 and the capacitor C2. For example, if the capacitance values of the capacitor C1 and the capacitor C2 are equal, that is, the capacitance difference is ΔC=C1−C2=0.

Figure 3:
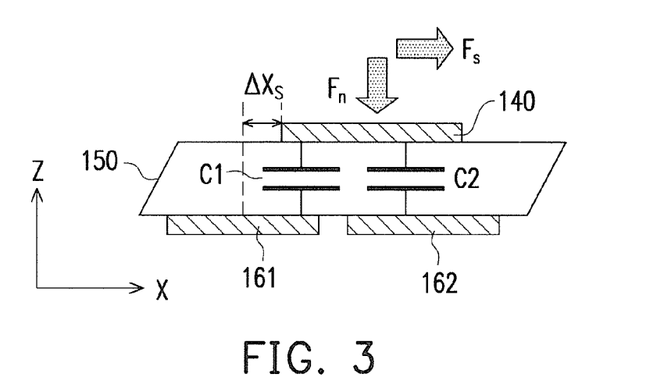
FIG. 3 is a schematic view illustrating a capacitive shear force sensor applied with a normal force and a transverse shear force according to an embodiment of the disclosure.
Figure 4:
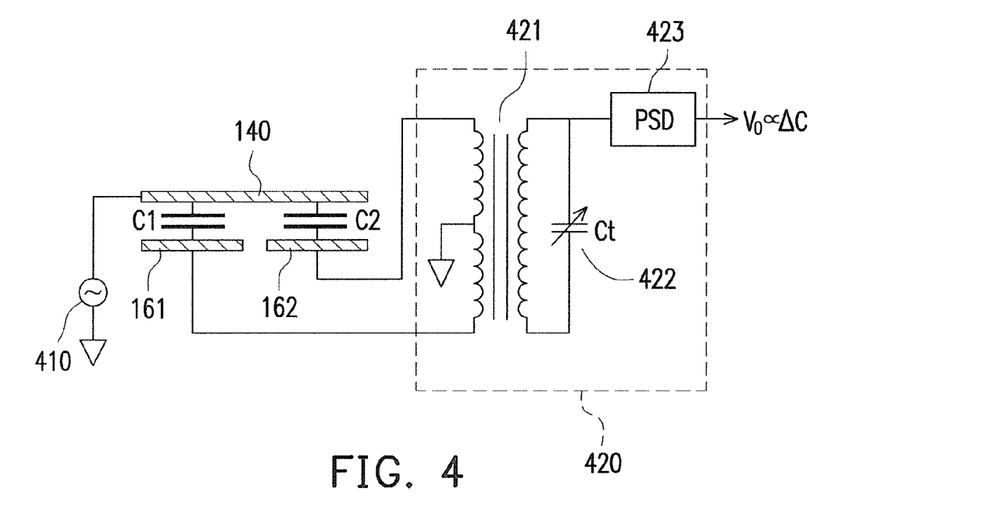
FIG. 4 is a schematic view illustrating a circuit structure of a differential capacitance detection circuit according to an embodiment of the disclosure.

FIG. 3 is a schematic view illustrating a capacitive shear force sensor applied with a normal force and a transverse shear force according to an embodiment of the disclosure. FIGS. 1 to 3 serve as cross-reference to each other. When the capacitive shear force sensor experiences a shear force Fs in X-axis direction, the shear force Fs may make the upper board 110 and the driving electrode 140 move $\Delta x_s$ in X-axis direction, as shown in FIG. 3. The first sensing electrode 161 and the second sensing electrode 162 are disposed in a direction of the shear force Fs. When the shear force Fs is applied to the driving electrode 140, the driving electrode 140 moves in X-axis direction. The driving electrode 140 moving in X-axis direction decreases the overlapped area size A of the electrode plates of the first capacitor C1, which decreases the capacitance value of the first capacitor C1 in response to the shear force Fs. On the contrary, the driving electrode 140 moving in X-axis direction increases the overlapped area size A of the electrode plates of the second capacitor C2, which increases the capacitance value of the second capacitor C2 in response to the shear force Fs. Therefore, a relation between the differential capacitance ΔC and the sheer deformation $\Delta x_s$ may be approximately represented in Equation (2).

$$\Delta C = C1 - C2 \qquad \text{Equation (2)}$$
$$= \frac{\varepsilon\varepsilon_0(A1 - \delta A1)}{d} - \frac{\varepsilon\varepsilon_0(A2 + \delta A2)}{d}$$
$$= -2\frac{\varepsilon\varepsilon_0 \delta A}{d} = -2\frac{\varepsilon\varepsilon_0 L}{d}\Delta x_s$$

In Equation (2), A1 and A2 respectively represent the overlapped area size of the electrode plates of the capacitor C1 and the overlapped area size of the electrode plates of the capacitor C2 before the shear force Fs is applied. In this example, it is assumed that A1=A2. δA1 and δA2 respectively represent a change of the overlapped area size of the capacitor C1 and a change of the overlapped area size of the capacitor C2 when the shear force Fs is applied. In this example, it is assumed that δA1=δA2=δA. If a geometric shape of a change δA of the overlapped area size is in a rectangle shape, and a length and a width of this rectangle are L and $\Delta x_s$ respectively, then δA=L*$\Delta x_s$. Based on Equation (2), it can be known that the capacitance difference ΔC between the capacitor C1 and capacitor C2 is positively proportional to the shear deformation $\Delta x_s$. Namely, by measuring a change of the capacitance difference ΔC between the capacitor C1 and the capacitor C2, a size and a direction of the shear force Fs may be known.

In other embodiment, the overlapped area size A1 of the electrode plates of the capacitor C1 and the overlapped area size A2 of the electrode plates of the capacitor C2 may be different, and/or the change δA1 of the overlapped area size of the capacitor C1 and the change δA2 of the overlapped area size of the capacitor C2 may be different. Based on Equation (2), it can be known that when A1 is not equal to A2, and/or when δA1 is not equal to δA2, the capacitance difference ΔC between the capacitor C1 and the capacitor C2 is still responsive to the shear force deformation $\Delta x_s$.

In this embodiment, any possible means may be used to obtain the shear force Fs based on the capacitance difference $\Delta C$. For example, in some embodiments, based on the material and geometrical properties of the dielectric layer 150 of the capacitive shear force sensor, an equation Fs=f($\Delta C$) of a relation between the capacitance difference $\Delta C$ and the shear force Fs may be determined. By using the equation Fs=f($\Delta C$), the shear force Fs may be computed based on the capacitance difference $\Delta C$. In some other embodiments, a correcting operation may be performed to the capacitive shear force sensor at an initializing stage, so as to obtain a "correction curve of the capacitance difference $\Delta C$ to the shear force Fs". Thereby, the "correction curve of the capacitance difference $\Delta C$ to the shear force Fs" may be used at a measuring stage, such that the shear force Fs may be obtained based on the capacitance difference $\Delta C$.

The capacitance difference $\Delta C$ may be measured with any differential capacitance detection circuit. For example, FIG. 4 is a schematic view illustrating a circuit structure of a differential capacitance detection circuit according to an embodiment of the disclosure. The differential capacitance detection circuit includes a driving signal source 410 and a sensing circuit 420. The driving electrode 140 is electrically connected to the driving signal source 410 to receive a driving signal, such as a radio frequency (RF) signal. The first sensing electrode 161 is electrically connected to a first sensing terminal of the sensing circuit 420, and the second sensing electrode 162 is electrically connected to a second sensing terminal of the sensing circuit 420. The sensing circuit 420 detects the capacitance difference $\Delta C$ between the capacitor C1 and the capacitor C2, wherein the capacitance difference $\Delta C$ is responsive to the shear force Fs applied to the driving electrode 140.

The sensing circuit 420 includes a RF transformer 421, a trimmer capacitor 422, and a phase sensitive detection (PSD) circuit 423. In the sensing circuit 420, two primary coils of the RF transformer 421 and the capacitors C1 and C2 to be tested form an inductance-capacitance bridge circuit. A common terminal (central tapping) of the two primary coils of the RF transformer 421 is connected to ground. The RF signal of the driving signal source 410 is respectively coupled to paths including C1 and C2. When C1 and C2 are equal, a RF current in a secondary coil of the RF transformer 421 is zero. When C1 and C2 are not equal, the RF current in the secondary coil of the RF transformer 421 is positively proportional to the capacitance value $\Delta C$.

The trimmer capacitor 422 is coupled to the secondary coil of the RF transformer 421. A reflected impedance of the trimmer capacitor 422 and the primary coils of the RF transformer 421 form an inductance-capacitance resonant circuit. A resonant frequency of the resonant circuit may be determined according to practical needs of the product. For example, the resonant frequency may be set at a detection frequency of 100 kHz. The phase sensitive detection circuit 423 further performs phase sensitive detection to detect a value of a RF current of the secondary coil of the RF transformer 421. The phase sensitive detection is well known, so no further details will be described herein.

The capacitive shear force sensor 100 in the embodiments above may be implemented with a manufacturing process of micro-electromechanical systems (MEMS), a manufacturing process of printed circuit boards (PCB), or other manufacturing processes. Compared to the manufacturing process of micro-electromechanical systems, the manufacturing process of printed circuit boards has a simpler process, shorter time course for design and development, lower cost, and a higher yield rate. In addition, printed circuit boards have a higher hardness. When a force is experienced in the shear direction (i.e. having the normal force and the shear force at the same time), the printed circuit boards prevent the electrode layers (e.g. 140 and 160) and the shielding layers (e.g. 120 and 180) from being bent and deformed, and restrains movement in the direction of the shear force.

In some applications, the capacitance signal sensed by the capacitive shear force sensor tends to be weak (e.g. at pF level) and is prone to be interfered by external noise. The capacitive shear force sensor 100 adds a structure of shielding layer (e.g. the first electric field shielding layer 120 and the second electric field shielding layer 180) to reduce interference from external noise, thereby improving sensitivity and resolution.

Details for embodying the embodiments above may be modified according to the practical needs of the product. For example, in another embodiment, the bump 102 may be disposed on the lower surface of the lower board 190. Namely, in another embodiment, the sensing electrodes 160 (i.e. 161 to 164) serve as moving electrodes, whereas the driving electrode 140 serves as a fixed electrode. In still another embodiment, the number and/or the shape of the sensing electrodes 160 may be different from the sensing electrodes 160 shown in FIG. 1.

Figure 5:
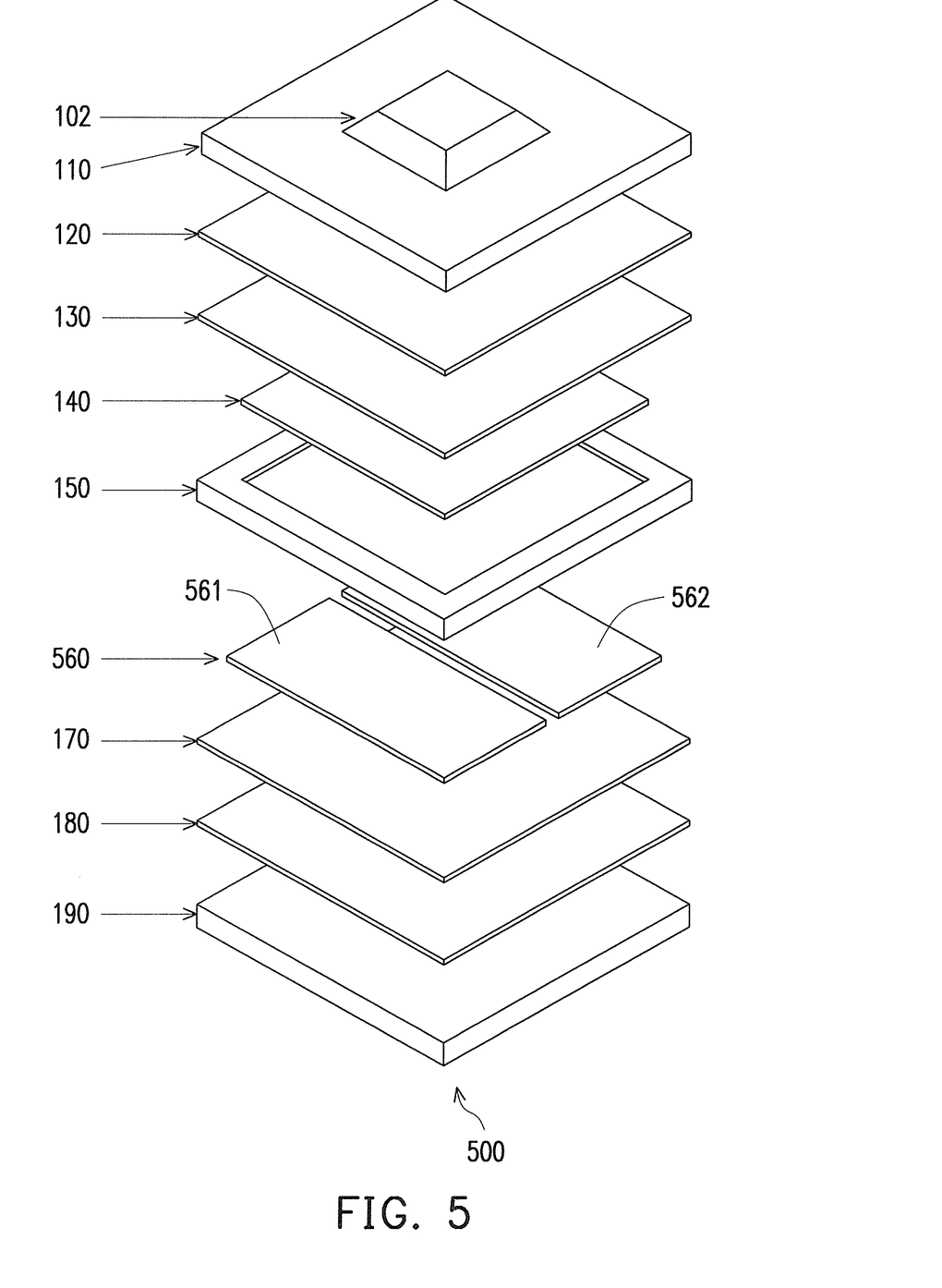
FIG. 5 is an exploded schematic view illustrating a capacitive shear force sensor according to another embodiment of the disclosure.

For example, FIG. 5 is an exploded schematic view illustrating a capacitive shear force sensor 500 according to another embodiment of the disclosure. Details of the embodiment shown in FIG. 5 may be embodied according to the description in FIGS. 1 to 4, so no further details will be reiterated hereinafter. What differs from the embodiment shown in FIG. 1 is that sensing electrodes 560 in the embodiment shown in FIG. 5 includes a first sensing electrode 561 and a second sensing electrode 562. The first sensing electrode 561 and the second sensing electrode 562 are in a rectangular shape respectively, and the first sensing electrode 561 and the second sensing electrode 562 together form a rectangular shape, as shown in FIG. 5. The sensing electrodes 560, 561, and 562 may be embodied with reference to the description of the sensing electrodes 160, 161, and 162 in FIGS. 1 to 4.

Figure 6:
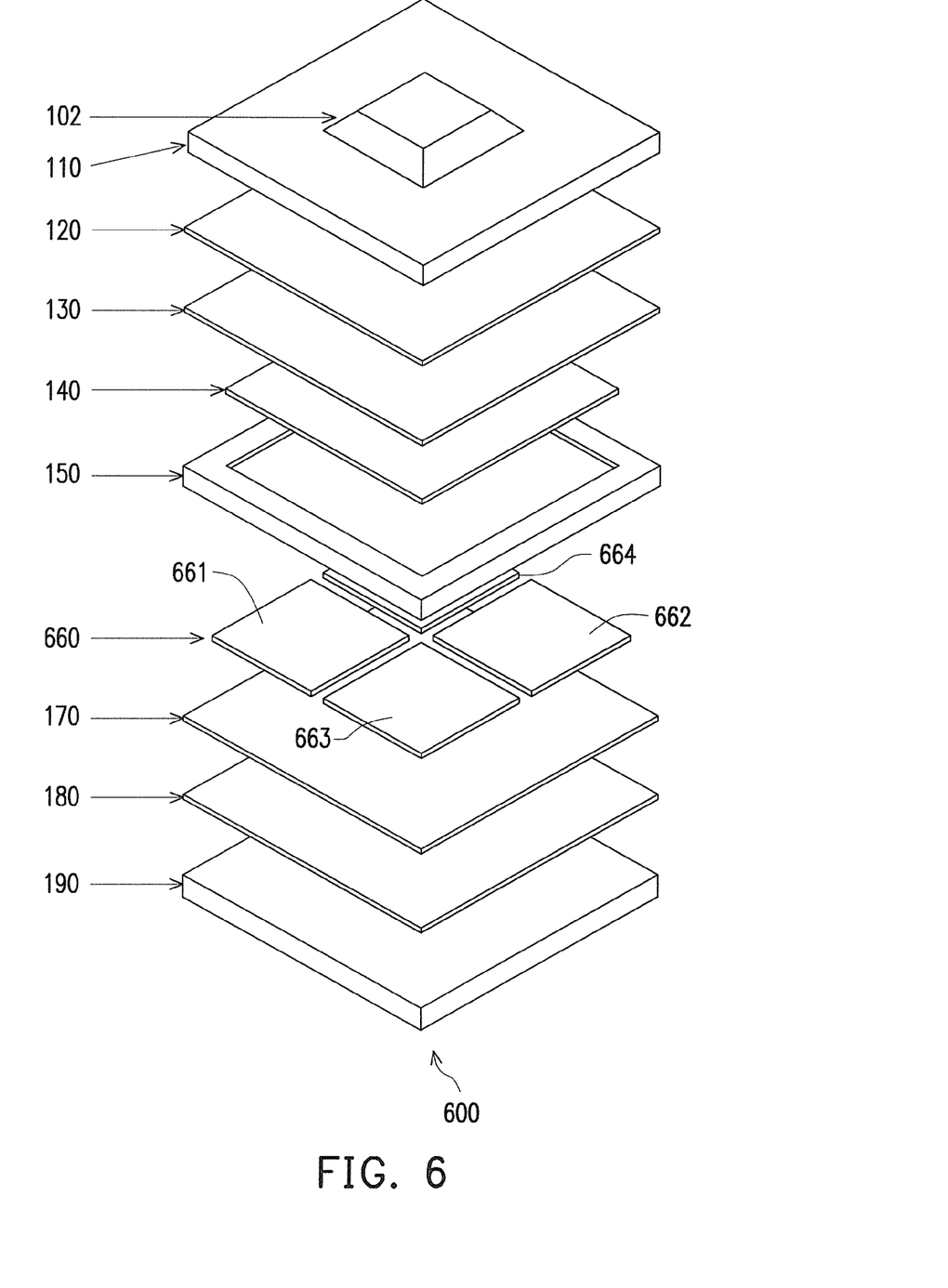
FIG. 6 is an exploded schematic view illustrating a capacitive shear force sensor according to still another embodiment of the disclosure.

Again, for example, FIG. 6 is an exploded schematic view illustrating a capacitive shear force sensor 600 according to still another embodiment of the disclosure. Details of the embodiment shown in FIG. 6 may be embodied according to the description in FIGS. 1 to 4, so no further details will be reiterated hereinafter. What differs from the embodiment shown in FIG. 1 is that sensing electrodes 660 shown in FIG. 6 includes a first sensing electrode 661, a second sensing electrode 662, a third sensing electrode 663, and a fourth sensing electrode 664. The first sensing electrode 661, the second sensing electrode 662, the third sensing electrode 663, and the fourth sensing electrode 664 are respectively in a rectangular shape, and the first sensing electrode 661, the second sensing electrode 662, the third sensing electrode 663, and the fourth sensing electrode 664 together form a rectangular shape, as shown in FIG. 6. The sensing electrodes 660, 661, 662, 663 and 664 may be embodied with reference to the description of the sensing electrodes 160, 161, 162, 163, and 164 in FIGS. 1 to 4.

In other embodiments, the bump 102 may be omitted. For example, in some embodiments, given that a friction coefficient of the upper surface of the upper board 110 meets the needs, a shear force may be applied to the flat surface of the upper board 110 to receive a shear force. In some other embodiments, mechanical grinding, abrasive blasting, compression molding, or other manufacturing processes may be used to roughen the upper surface of the upper board 110, so as to increase the friction coefficient of the upper surface of the upper board 110.

Figure 7:
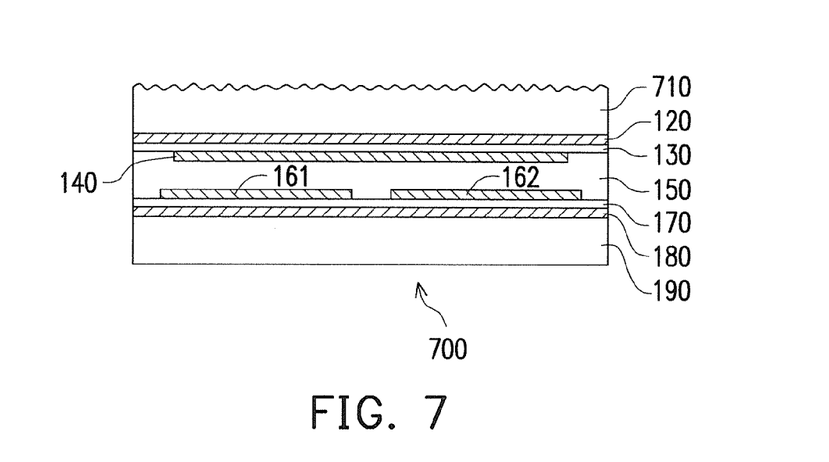
FIG. 7 is a cross-sectional schematic view illustrating a capacitive shear force sensor according to yet another embodiment of the disclosure.

For example, FIG. 7 is a cross-sectional schematic view illustrating a capacitive shear force sensor 700 according to yet another embodiment of the disclosure. Details of the embodiment shown in FIG. 7 may be embodied with reference to the description in FIGS. 1 to 4, so no further details will be reiterated hereinafter. What differs from the embodiment shown in FIG. 1 is that the bump 102 is omitted in the embodiment shown in FIG. 7, and an upper surface of an upper board 710 has a rough surface after being roughened, so as to receive a shear force, as shown in FIG. 7. The upper board 710 may be found with reference to the description of the upper board 110 in FIGS. 1 to 4.

Figure 8:
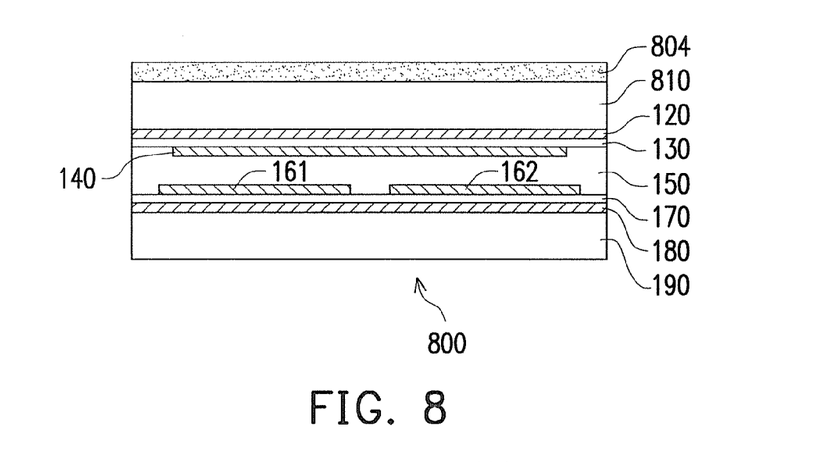
FIG. 8 is a cross-sectional schematic view illustrating a capacitive shear force sensor according to one further embodiment of the disclosure.

Again, for example, FIG. 8 is a cross-sectional schematic view illustrating a capacitive shear force sensor 800 according to one further embodiment of the disclosure. The embodiment shown in FIG. 8 may be embodied with reference to the description in FIGS. 1 to 4, so no further details will be reiterated hereinafter. What differs from the embodiment shown in FIG. 1 is that the bump 102 is omitted in the embodiment shown in FIG. 8, and a frictional layer 804 is disposed on an upper surface of an upper board 810 to receive a shear force, as shown in FIG. 8. A material of the frictional layer 804 may be any material with a high friction coefficient, or any material having a slight viscosity. The upper board 810 may be embodied with reference to the description of the upper board 110 in FIGS. 1 to 4.

Figure 9:
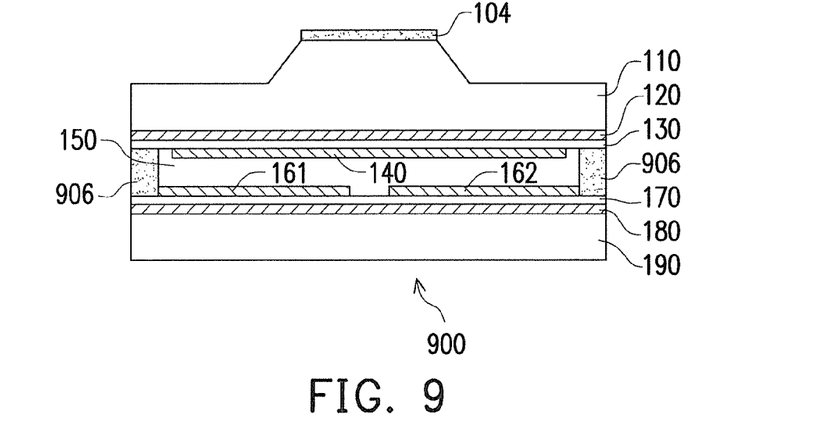
FIG. 9 is a cross-sectional schematic view illustrating a capacitive shear force sensor according to one further embodiment of the disclosure.

In other embodiments, a spacer may be disposed between the upper board 110 and the lower board 190 to prevent a short circuit between the driving electrode 140 and the sensing electrodes 160. For example, FIG. 9 is a cross-sectional schematic view illustrating a capacitive shear force sensor 900 according to one further embodiment of the disclosure. The embodiment shown in FIG. 9 may be embodied with reference to the description in FIGS. 1 to 4, so no further details will be reiterated hereinafter. What differs from the embodiment shown in FIG. 1 is that a spacer 906 is disposed between the upper board 110 and the lower board 190 in the embodiment shown in FIG. 9, so as to resist the normal force and prevent a short circuit between the driving electrode 140 and the sensing electrodes 160, as shown in FIG. 9. A material of the spacer 906 is a soft material (e.g. polydimethylsiloxane or silicone rubber). Since the spacer 906 is disposed between the upper board 110 and the lower board 190, the dielectric layer 150 may be gas (e.g. air), liquid, or kept vacuum in this embodiment.

Figure 10:
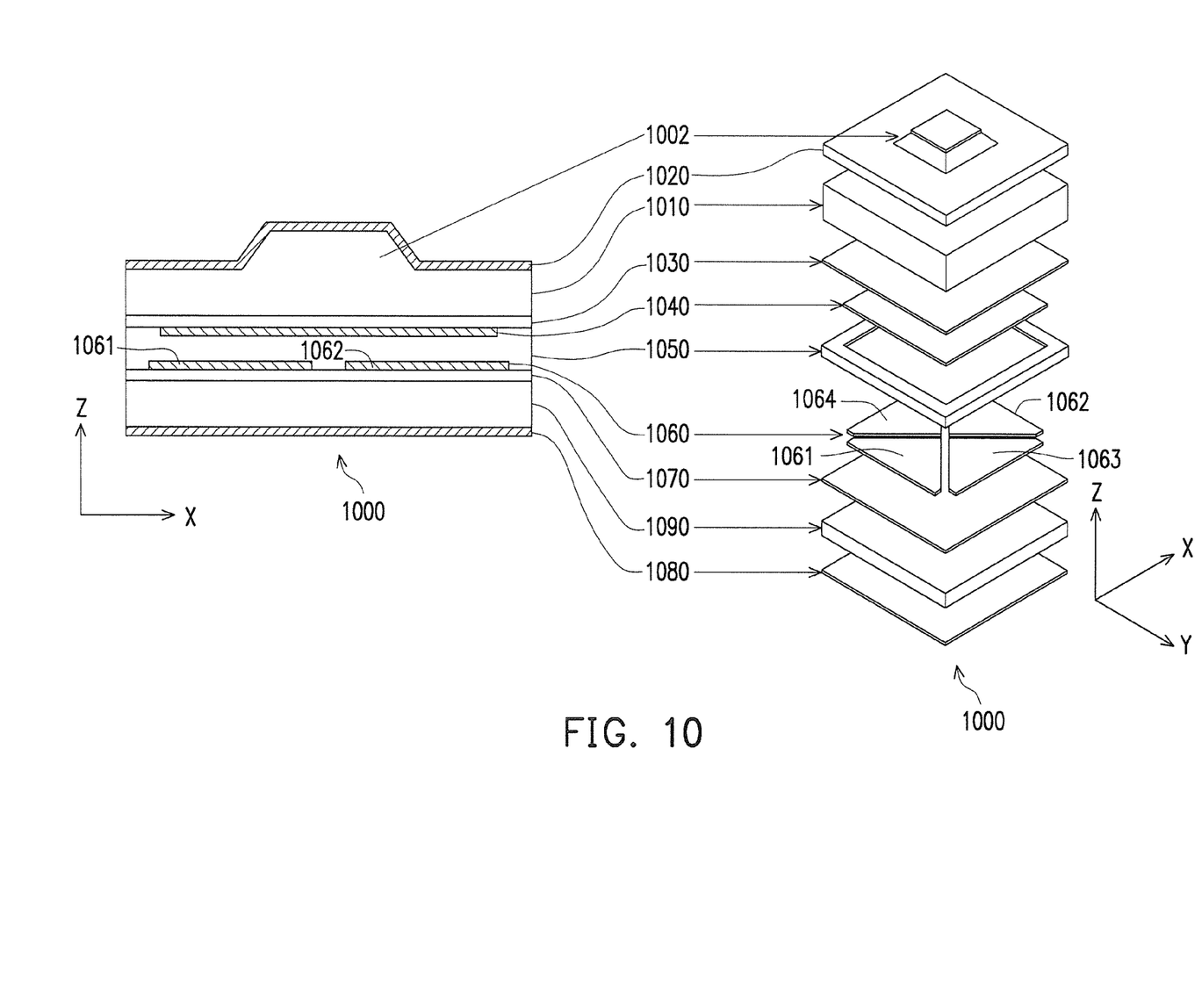
FIG. 10 is a structural schematic view illustrating a capacitive shear force sensor according to yet another embodiment of the disclosure.

FIG. 10 is a structural schematic view illustrating a capacitive shear force sensor 1000 according to yet another embodiment of the disclosure. The right part of FIG. 10 illustrates an exploded view of the capacitive shear force sensor 1000, whereas the left part of FIG. 10 illustrates a cross-sectional view of the capacitive shear force sensor 1000. The capacitive shear force sensor 1000 includes a first electric field shielding layer 1020, an upper board 1010, a first insulating layer 1030, a driving electrode 1040, a dielectric layer 1050, sensing electrodes 1060, a second insulating layer 1070, a lower board 1090, and a second electric field shielding layer 1080. In this embodiment, the sensing electrodes 1060 include a first sensing electrode 1061, a second sensing electrode 1062, a third sensing electrode 1063, and a fourth sensing electrode 1064. Details of the embodiment shown in FIG. 10 may be embodied with reference to the description in FIGS. 1 to 9, so no further details will be reiterated hereinafter. For example, a bump 1002, the first electric field shielding layer 1020, the upper board 1010, the first insulating layer 1030, the driving electrode 1040, the dielectric layer 1050, the sensing electrodes 1060, the second insulating layer 1070, the lower board 1090, and the second electric field shielding layer 1080 may be embodied with reference to the description of the bump 102, the first electric field shielding layer 120, the upper board 110, the first insulating layer 130, the driving electrode 140, the dielectric layer 150, the sensing electrodes 160, the second insulating layer 170, the lower board 190, and the second electric field shielding layer 180, respectively. What differs from the embodiment illustrated in FIG. 1 is that the upper board 1010 in the embodiment shown in FIG. 10 is disposed between the first electric field shielding layer 1020 and the driving electrode 1040, and the lower board 1090 is disposed between the second electric field shielding layer 1080 and the sensing electrodes 1060 (i.e. 1061, 1062, 1063, and 1064).

In some embodiments, given that a material of the upper board 1010 is a non-conductive material, the first insulating layer 1030 may be omitted, such that the driving electrode 1040 may be directly fixed to a lower surface of the upper board 1010. Similarly, given that a material of the lower board 1090 is a non-conductive material, the second insulating layer 1070 may be omitted, such that the sensing electrodes 1060 (i.e. 1061, 1062, 1063, and 1064) are directly fixed to an upper surface of the lower board 1090.

Figure 11:
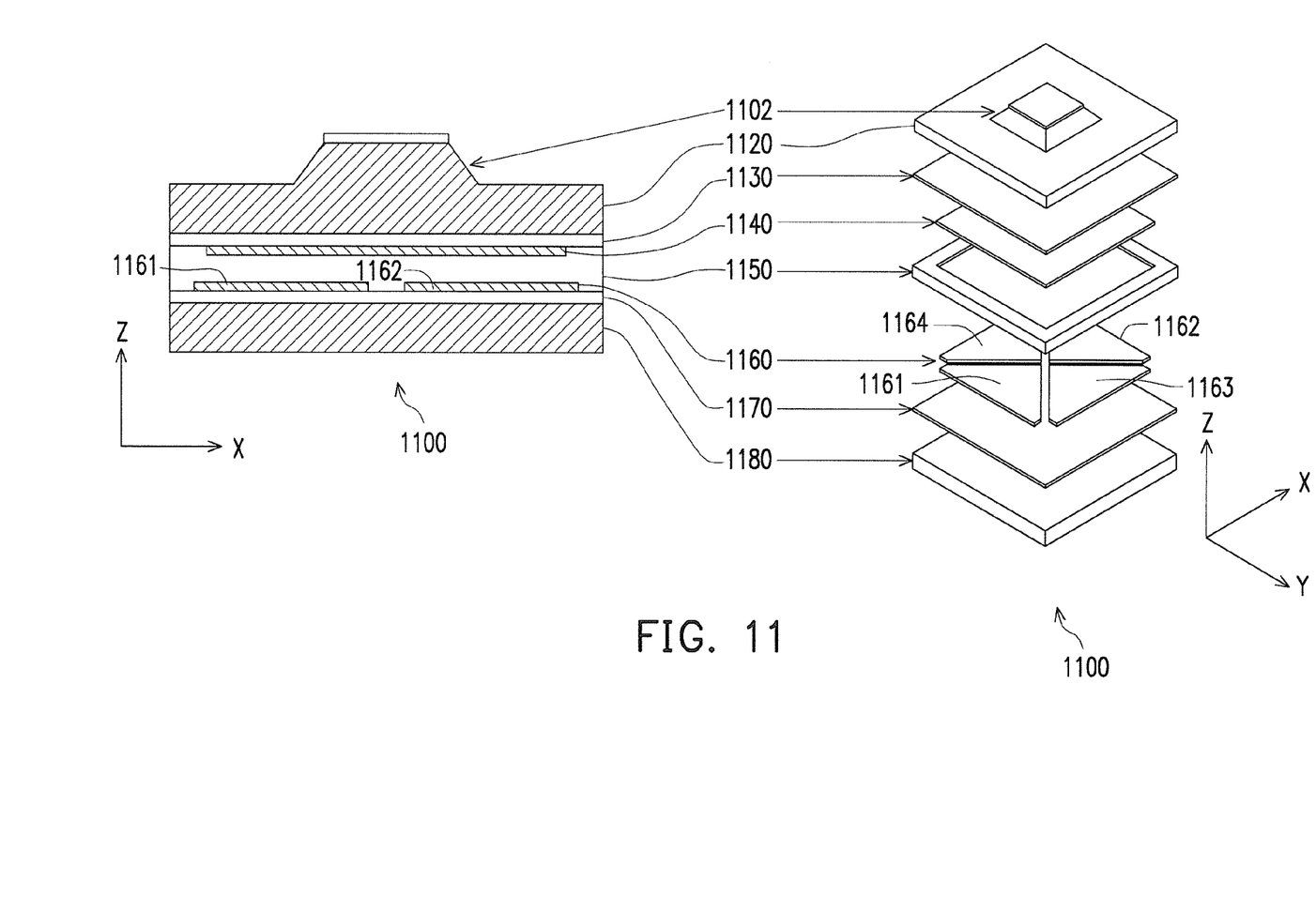
FIG. 11 is a structural schematic view illustrating a capacitive shear force sensor according to yet another embodiment of the disclosure.

FIG. 11 is a structural schematic view illustrating a capacitive shear force sensor 1100 according to yet another embodiment of the disclosure. The right part of FIG. 11 illustrates an exploded view of the capacitive shear force sensor 1100, whereas the left part of FIG. 11 illustrates a cross-sectional view of the capacitive shear force sensor 1100. The capacitive shear force sensor 1100 includes a first electric field shielding layer 1120, a first insulating layer 1130, a driving electrode 1140, a dielectric layer 1150, a plurality of sensing electrodes 1160, a second insulating layer 1170, and a second electric field shielding layer 1180. In this embodiment, the sensing electrodes 1160 include a first sensing electrode 1161, a second sensing electrode 1162, a third sensing electrode 1163, and a fourth sensing electrode 1164. The embodiment shown in FIG. 11 may be embodied with reference to the description in FIGS. 1 to 9, so no further details will be reiterated hereinafter. For example, the first electric field shielding layer 1120, the first insulating layer 1130, the driving electrode 1140, the dielectric layer 1150, the sensing electrodes 1160, the second insulating layer 1170, and the second electric field shielding layer 1180 may be embodied with reference to the description of the first electric field shielding layer 120, the first insulating layer 130, the driving electrode 140, the dielectric layer 150, the sensing electrodes 160, the second insulating layer 170, and the second electric field shielding layer 180, respectively. What differs from the embodiment shown in FIG. 1 is that the upper board 110 and the lower board 190 are omitted in the capacitive shear force sensor 1100 in the embodiment shown in FIG. 11.

In the embodiment shown in FIG. 11, an upper surface of the first electric field shielding layer 1120 has at least one bump 1102 to receive a shear force. Other details of the bump 1102 may be embodied according to the description of the bump 102 in FIGS. 1 to 9. However, the embodiment of the first electric field shielding layer 1120 may not be limited by the illustration of FIG. 11. For example, in another embodiment, the upper surface of the first electric field shielding layer 1120 has a rough surface (see the description of FIG. 7 for further embodying details) to receive a shear force. In other embodiments, the flat upper surface of the first electric field shielding layer 1120 may be disposed with a frictional layer with a high friction coefficient (see the description of FIG. 8 for further embodying details) to receive a shear force.

Figure 12:
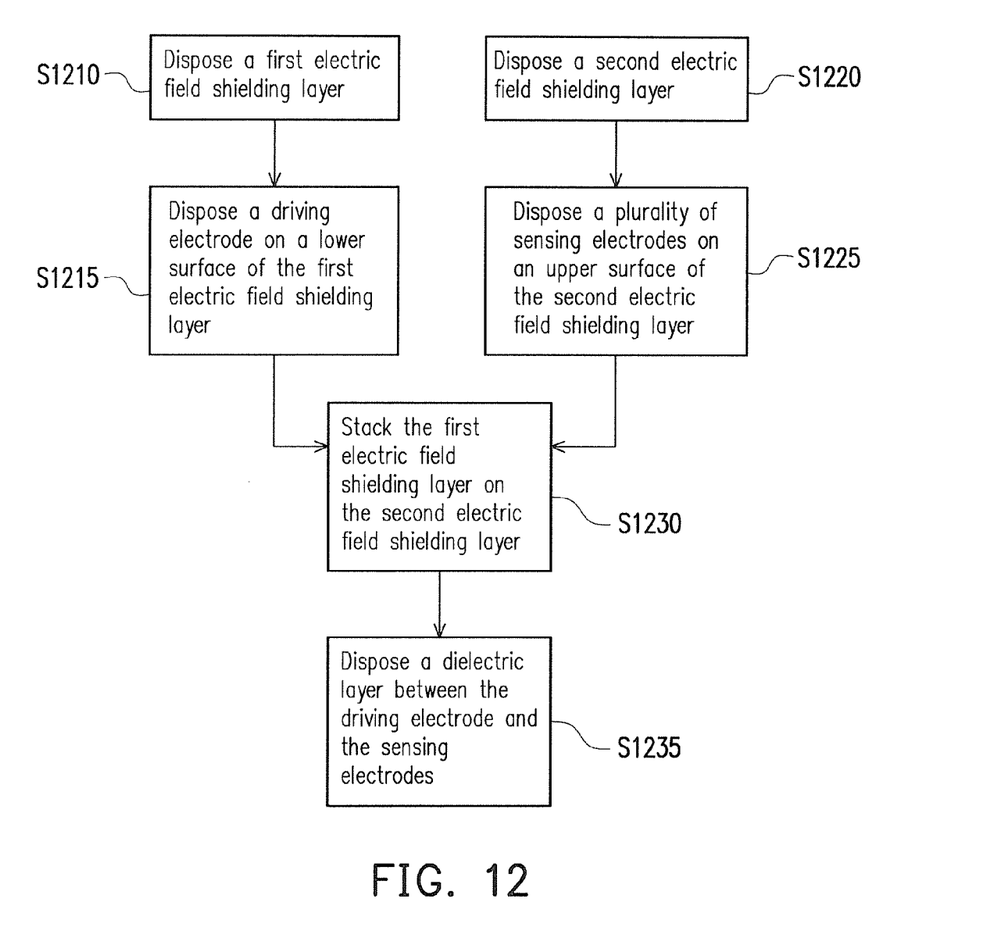
FIG. 12 is a flow chart illustrating a method for fabricating a capacitive shear force sensor according to an embodiment of the disclosure.

FIG. 12 is a flow chart illustrating a method for fabricating a capacitive shear force sensor according to an embodiment of the disclosure. At step S1210, a first electric field shielding layer is disposed, wherein the first electric field shielding layer has a lower surface. At step 1215, a driving electrode is disposed on the lower surface of the first electric field shielding layer. At step S1220, a second electric field shielding layer is disposed, wherein the second electric field shielding layer has an upper surface. At step S1225, a plurality of sensing electrodes (e.g. a first sensing electrode and a second sensing electrode) are disposed on the upper surface of the second electric field shielding layer, wherein the sensing electrodes do not contact each other. At step S1230, the first electric field shielding layer is stacked on the second electric field shielding layer, such that the driving electrode and the sensing electrodes are disposed between the first electric field shielding layer and the second electric field shielding layer. At step S1235, a dielectric layer is disposed between the driving electrode and the sensing electrodes, wherein the first sensing electrode and the driving electrode form a first capacitor, and the second sensing electrode and the driving electrode form a second capacitor.

In some embodiments, the method for fabrication further includes a disposing process to dispose an upper board on an upper surface of the first electric field shielding layer to receive a shear force. In other embodiments, the method for fabrication further includes a forming process to form a rough surface on an upper surface of the upper board to receive a shear force. In some other embodiments, the method for fabrication further includes a forming process to form at least one bump on the upper surface of the upper board to receive a shear force.

In some embodiments, the method for fabrication further includes a disposing process to dispose a lower board under a lower surface of the second electric field shielding layer. In some other embodiments, the method for fabrication further includes a forming process to form at least one bump on a lower surface of the lower board to receive a shear force.

In some embodiments, the method for fabrication further includes disposing a first insulating layer between the first electric field shielding layer and the driving electrode, and disposing a second insulating layer between the second electric field shielding layer and the first sensing electrode and between the second electric field shielding layer and the second sensing electrode.

In some embodiments, the method for fabrication further includes a disposing process to dispose a spacer between the lower surface of the first electric field shielding layer and the upper surface of the second electric field shielding layer.

Different embodiments of the method for fabrication may be embodied with relevant description of FIGS. 1 to 11, so details will not be reiterated hereinafter.

In view of the foregoing, the capacitive shear force sensor provided in the embodiments adds the structure of electric field shielding layer to reduce external interference, such that a signal of shear force does not differ as a material of a grabbed object differs, thereby improving sensitivity and resolution. In some embodiments, the manufacturing process of printed circuit boards may be used to implement the capacitive shear force sensor, thereby enjoying the advantages of a simpler manufacture process, shorter time course for design and/or development, lower cost, and a higher yield rate. In some other embodiments, the capacitive shear force sensor may be applied to an end effector of a robotic claw, so as to sense a shear force to determine whether or not the grabbed object is sliding, and then feedback and adjust a grabbing force.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A capacitive shear force sensor, comprising:
   a first electric field shielding layer, having a lower surface;
   a second electric field shielding layer, having an upper surface, wherein the second electric field shielding layer is disposed under the first electric field shielding layer;
   a driving electrode, disposed under the lower surface of the first electric field shielding layer, and disposed between the first electric field shielding layer and the second electric field shielding layer;
   a first sensing electrode, disposed on the upper surface of the second electric field shielding layer, and disposed between the driving electrode and the second electric field shielding layer, wherein the first sensing electrode and the driving electrode form a first capacitor;
   a second sensing electrode, disposed on the upper surface of the second electric field shielding layer, and disposed between the driving electrode and the second electric field shielding layer, wherein the second sensing electrode does not contact the first sensing electrode, and the second sensing electrode and the driving electrode form a second capacitor, wherein when a shear force is applied to the driving electrode, an overlapped area size of electrode plates of one of the first capacitor and the second capacitor is decreased in response to the shear force, and an overlapped area size of electrode plates of another one of the first capacitor and the second capacitor is increased in response to the shear force; and
   a dielectric layer, disposed between the driving electrode and the first sensing electrode, and disposed between the driving electrode and the second sensing electrode.

2. The capacitive shear force sensor as claimed in claim 1, wherein an upper surface of the first electric field shielding layer has a rough surface to receive a shear force.

3. The capacitive shear force sensor as claimed in claim 1, wherein an upper surface of the first electric field shielding layer has at least one bump to receive a shear force.

4. The capacitive shear force sensor as claimed in claim 1, further comprising:
   an upper board, disposed on an upper surface of the first electric field shielding layer to receive a shear force.

5. The capacitive shear force sensor as claimed in claim 4, wherein an upper surface of the upper board has a rough surface to receive the shear force.

6. The capacitive shear force sensor as claimed in claim 4, wherein an upper surface of the upper board has at least one bump to receive the shear force.

7. The capacitive shear force sensor as claimed in claim 4, wherein a material of the upper board is a hard material.

8. The capacitive shear force sensor as claimed in claim 7, wherein the hard material comprises a bakelite, a printed circuit board, a metal, or an ebonite rubber.

9. The capacitive shear force sensor as claimed in claim 1, further comprising:
   a lower board, disposed on a lower surface of the second electric field shielding layer.

10. The capacitive shear force sensor as claimed in claim 9, wherein a lower surface of the lower board has at least one bump to receive a shear force.

11. The capacitive shear force sensor as claimed in claim 9, wherein the lower board is a printed circuit board.

12. The capacitive shear force sensor as claimed in claim 1, further comprising:
   a first insulating layer, disposed between the first electric field shielding layer and the driving electrode; and
   a second insulating layer, disposed between the second electric field shielding layer and the first sensing electrode, and disposed between the second electric field shielding layer and the second sensing electrode.

13. The capacitive shear force sensor as claimed in claim 12, wherein a material of the first insulating layer and the second insulating layer is a hard material.

14. The capacitive shear force sensor as claimed in claim 13, wherein the hard material comprises a printed circuit board or parylene.

15. The capacitive shear force sensor as claimed in claim 1, wherein a portion of the driving electrode is overlapped with the first sensing electrode, and a portion of the driving electrode is overlapped with the second sensing electrode.

16. The capacitive shear force sensor as claimed in claim 1, wherein the driving electrode is electrically connected to a driving signal source to receive a driving signal, the first sensing electrode is electrically connected to a first sensing terminal of a sensing circuit, the second sensing electrode is electrically connected to a second sensing terminal of the sensing circuit, and the sensing circuit detects a capacitance difference between the first capacitor and the second capacitor, wherein the capacitance difference is responsive to a shear force applied to the driving electrode.

17. The capacitive shear force sensor as claimed in claim 16, wherein when the shear force moves the driving electrode, a capacitance value of one of the first capacitor and the second capacitor decreases in response to the shear force, and a capacitance value of the other of the first capacitor and the second capacitor increases in response to the shear force.

18. The capacitive shear force sensor as claimed in claim 16, wherein the driving signal is a radio frequency signal.

19. The capacitive shear force sensor as claimed in claim 1, wherein a material of the dielectric layer is a soft material.

20. The capacitive shear force sensor as claimed in claim 19, wherein the soft material comprises polydimethylsiloxane or silicone rubber.

21. The capacitive shear force sensor as claimed in claim 1, further comprising:
   a spacer, disposed between the lower surface of the first electric field shielding layer and the upper surface of the second electric field shielding layer.

22. The capacitive shear force sensor as claimed in claim 21, wherein a material of the spacer is a soft material.

23. The capacitive shear force sensor as claimed in claim 22, wherein the soft material comprises polydimethylsiloxane or silicone rubber.

24. The capacitive shear force sensor as claimed in claim 1, further comprising:
   a third sensing electrode, disposed on the upper surface of the second electric field shielding layer, and disposed between the driving electrode and the second electric field shielding layer, wherein the third sensing electrode does not contact the first sensing electrode and the second sensing electrode, and the third sensing electrode and the driving electrode form a third capacitor; and
   a fourth sensing electrode, disposed on the upper surface of the second electric field shielding layer, and disposed between the driving electrode and the second electric field shielding layer, wherein the fourth sensing electrode does not contact the first sensing electrode, the second sensing electrode and the third electrode, and the fourth sensing electrode and the driving electrode form a fourth capacitor, and
   wherein the dielectric layer is disposed between the driving electrode and the third sensing electrode, and disposed between the driving electrode and the fourth sensing electrode.

25. The capacitive shear force sensor as claimed in claim 24, wherein a portion of the first sensing electrode is overlapped with the driving electrode, a portion of the second sensing electrode is overlapped with the driving electrode, a portion of the third sensing electrode is overlapped with the driving electrode, and a portion of the fourth sensing electrode is overlapped with the driving electrode.

26. The capacitive shear force sensor as claimed in claim 24, wherein the first sensing electrode, the second sensing electrode, the third sensing electrode and the fourth sensing electrode are respectively in a triangular shape, and the first sensing electrode, the second sensing electrode, the third sensing electrode and the fourth sensing electrode together form a rectangular shape.

27. The capacitive shear force sensor as claimed in claim 24, wherein the first sensing electrode, the second sensing electrode, the third sensing electrode and the fourth sensing electrode are respectively in a rectangular shape, and the first sensing electrode, the second sensing electrode, the third sensing electrode and the fourth sensing electrode together form a rectangular shape.

28. A method for fabricating a capacitive shear force sensor, comprising:
   disposing a first electric field shielding layer having a lower surface;
   disposing a driving electrode on the lower surface of the first electric field shielding layer;
   disposing a second electric field shielding layer having an upper surface;
   disposing a first sensing electrode and a second sensing electrode on the upper surface of the second electric field shielding layer, wherein the second sensing electrode does not contact the first sensing electrode;
   stacking the first electric field shielding layer on the second electric field shielding layer, such that the driving electrode, the first sensing electrode and the second sensing electrode are disposed between the first electric field shielding layer and the second electric field shielding layer; and
   disposing a dielectric layer between the driving electrode and the first sensing electrode and between the driving electrode and the second sensing electrode, wherein the first sensing electrode and the driving electrode form a first capacitor, and the second sensing electrode and the driving electrode form a second capacitor, wherein when a shear force is applied to the driving electrode, an overlapped area size of electrode plates of one of the first capacitor and the second capacitor is decreased in response to the shear force, and an overlapped area size of electrode plates of another one of the first capacitor and the second capacitor is increased in response to the shear force.

29. The method for fabricating the capacitive shear force sensor as claimed in claim 28, wherein the first electric field shielding layer is a conductive substrate, and an upper surface of the first electric field shielding layer has a rough surface to receive a shear force.

30. The method for fabricating the capacitive shear force sensor as claimed in claim 28, wherein the first electric field shielding layer is a conductive substrate, and an upper surface of the first electric field shielding layer has at least one bump to receive a shear force.

31. The method for fabricating the capacitive shear force sensor as claimed in claim 28, further comprising:
disposing an upper board on an upper surface of the first electric field shielding layer to receive a shear force.

32. The method for fabricating the capacitive shear force sensor as claimed in claim 31, further comprising:
forming a rough surface on an upper surface of the upper board to receive the shear force.

33. The method for fabricating the capacitive shear force sensor as claimed in claim 31, further comprising:
forming at least one bump on an upper surface of the upper board to receive the shear force.

34. The method for fabricating the capacitive shear force sensor as claimed in claim 31, wherein a material of the upper board is a hard material.

35. The method for fabricating the capacitive shear force sensor as claimed in claim 34, wherein the hard material comprises a bakelite, a printed circuit board, a metal, or an ebonite rubber.

36. The method for fabricating the capacitive shear force sensor as claimed in claim 28, further comprising:
disposing a lower board on a lower surface of the second electric field shielding layer.

37. The method for fabricating the capacitive shear force sensor as claimed in claim 36, further comprising:
forming at least one bump on a lower surface of the lower board to receive a shear force.

38. The method for fabricating the capacitive shear force sensor as claimed in claim 36, wherein the lower board is a printed circuit board.

39. The method for fabricating the capacitive shear force sensor as claimed in claim 28, further comprising:
disposing a first insulating layer between the first electric field shielding layer and the driving electrode; and
disposing a second insulating layer between the second electric field shielding layer and the first sensing electrode, and between the second electric field shielding layer and the second sensing electrode.

40. The method for fabricating the capacitive shear force sensor as claimed in claim 39, wherein a material of the first insulating layer and the second insulating layer is a hard material.

41. The method for fabricating the capacitive shear force sensor as claimed in claim 40, wherein the hard material comprises a printed circuit board or parylene.

42. The method for fabricating the capacitive shear force sensor as claimed in claim 28, wherein a portion of the driving electrode is overlapped with the first sensing electrode, and a portion of the driving electrode is overlapped with the second sensing electrode.

43. The method for fabricating the capacitive shear force sensor as claimed in claim 28, further comprising:
electrically connecting the driving electrode to a driving signal source to receive a driving signal;
electrically connecting the first sensing electrode to a first sensing terminal of a sensing circuit; and
electrically connecting the second sensing electrode to a second sensing terminal of the sensing circuit,
wherein the sensing circuit detects a capacitance difference between the first capacitor and the second capacitor, wherein the capacitance difference is responsive to a shear force applied to the driving electrode.

44. The method for fabricating the capacitive shear force sensor as claimed in claim 43, wherein when the shear force moves the driving electrode, a capacitance value of one of the first capacitor and the second capacitor decreases in response to the shear force, and a capacitance value of the other of the first capacitor and the second capacitor increases in response to the shear force.

45. The method for fabricating the capacitive shear force sensor as claimed in claim 28, wherein a material of the dielectric layer is a soft material.

46. The method for fabricating the capacitive shear force sensor as claimed in claim 45, wherein the soft material comprises polydimethylsiloxane or silicone rubber.

47. The method for fabricating the capacitive shear force sensor as claimed in claim 28, further comprising:
disposing a spacer between the lower surface of the first electric field shielding layer and the upper surface of the second electric field shielding layer.

48. The method for fabricating the capacitive shear force sensor as claimed in claim 47, wherein a material of the spacer is a soft material.

49. The method for fabricating the capacitive shear force sensor as claimed in claim 48, wherein the soft material comprises polydimethylsiloxane or silicone rubber.

50. The method for fabricating the capacitive shear force sensor as claimed in claim 28, further comprising:
disposing a third sensing electrode and a fourth sensing electrode on the upper surface of the second electric field shielding layer and between the driving electrode and the second electric field shielding layer, wherein the first sensing electrode, the second sensing electrode, the third sensing electrode and the fourth sensing electrode do not contact each other,
wherein the dielectric layer is disposed between the driving electrode and the third sensing electrode and between the driving electrode and the fourth sensing electrode, and
wherein the third sensing electrode and the driving electrode form a third capacitor, and the fourth sensing electrode and the driving electrode form a fourth capacitor.

51. The method for fabricating the capacitive shear force sensor as claimed in claim 50, wherein a portion of the first sensing electrode is overlapped with the driving electrode, a portion of the second sensing electrode is overlapped with the driving electrode, a portion of the third sensing electrode is overlapped with the driving electrode, and a portion of the fourth sensing electrode is overlapped with the driving electrode.

52. The method for fabricating the capacitive shear force sensor as claimed in claim 50, wherein the first sensing electrode, the second sensing electrode, the third sensing electrode and the fourth sensing electrode are respectively in a triangular shape, and the first sensing electrode, the second sensing electrode, the third sensing electrode and the fourth sensing electrode together form a rectangular shape.

53. The method for fabricating the capacitive shear force sensor as claimed in claim 50, wherein the first sensing electrode, the second sensing electrode, the third sensing electrode and the fourth sensing electrode are respectively in a triangular shape, and the first sensing electrode, the second sensing electrode, the third sensing electrode and the fourth sensing electrode together form a rectangular shape.

\* \* \* \* \*